United States Patent [19]

Mercer

[11] 4,336,638
[45] Jun. 29, 1982

[54] APPARATUS FOR STRETCHING PLASTIC WEBS

[75] Inventor: Frank B. Mercer, Blackburn, England

[73] Assignee: Netlon Limited, Blackburn, England

[21] Appl. No.: 952,211

[22] Filed: Oct. 17, 1978

Related U.S. Application Data

[60] Continuation-in-part of Ser. No. 873,945, Jan. 31, 1978, abandoned, which is a division of Ser. No. 689,127, May 24, 1976, Pat. No. 4,087,226.

[30] Foreign Application Priority Data

| May 23, 1975 | [GB] | United Kingdom | 22649/75 |
| Oct. 17, 1977 | [GB] | United Kingdom | 43159/77 |
| Feb. 9, 1978 | [GB] | United Kingdom | 5305/78 |
| May 31, 1978 | [GB] | United Kingdom | 43159/78 |

[51] Int. Cl.$^3$ ............................................. D06C 3/06
[52] U.S. Cl. ................................................ 26/99
[58] Field of Search .................. 264/290.2; 26/87, 99, 26/71, 90, 87, 99; 425/445

[56] References Cited

U.S. PATENT DOCUMENTS

| 1,732,968 | 10/1929 | Dwight | 26/87 |
| 2,158,087 | 5/1939 | Nowe et al. | |
| 3,220,056 | 11/1965 | Walton | |
| 3,257,488 | 6/1966 | Rasmussen | |
| 3,305,911 | 2/1967 | Chapman et al. | |
| 3,315,301 | 4/1967 | Dibblee et al. | |
| 3,466,358 | 9/1969 | Muller | |
| 3,517,098 | 6/1970 | Nasmussen | |
| 3,570,064 | 3/1971 | DeGroot | |
| 3,577,586 | 5/1971 | Kalwaites et al. | |
| 3,624,874 | 12/1971 | Lauchenauer | |
| 3,849,526 | 11/1974 | Muller et al. | |

FOREIGN PATENT DOCUMENTS

| 17730 | 4/1882 | Fed. Rep. of Germany | |
| 89315 | 10/1896 | Fed. Rep. of Germany | |
| 94520 | 10/1897 | Fed. Rep. of Germany | |
| 830413 | 2/1952 | Fed. Rep. of Germany | |
| 1934759 | 11/1973 | Fed. Rep. of Germany | |
| 2503775 | 8/1976 | Fed. Rep. of Germany | 26/99 |
| 2613822 | 10/1976 | Fed. Rep. of Germany | |
| 424 | of 1866 | United Kingdom | |
| 14608 | of 1884 | United Kingdom | |
| 2421 | of 1885 | United Kingdom | |
| 5621 | of 1886 | United Kingdom | |
| 19078 | of 1897 | United Kingdom | |
| 8230 | of 1900 | United Kingdom | |
| 904386 | 8/1962 | United Kingdom | |
| 1340942 | 12/1973 | United Kingdom | |
| 272260 | 8/1970 | U.S.S.R. | |

Primary Examiner—Robert Mackey
Attorney, Agent, or Firm—Holman & Stern

[57] ABSTRACT

An apparatus is afforded for transversely stretching a continuously advancing flexible web between a pair of opposed banks of tranversely-spaced pressure elements, one of which banks is stationary and whose elements have slide surfaces, the margins of the web being restrained to prevent substantial inward movement of said margins.

14 Claims, 11 Drawing Figures

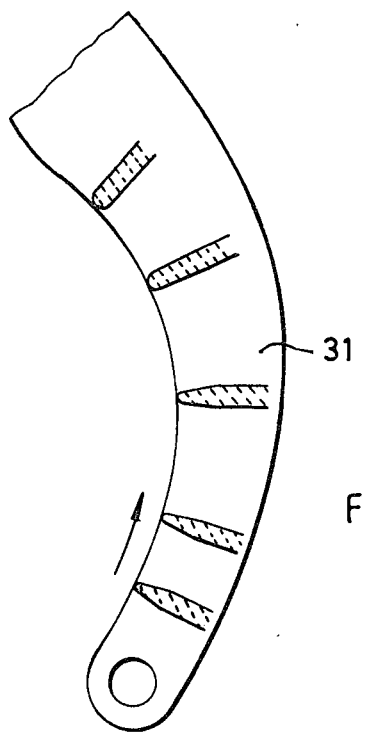
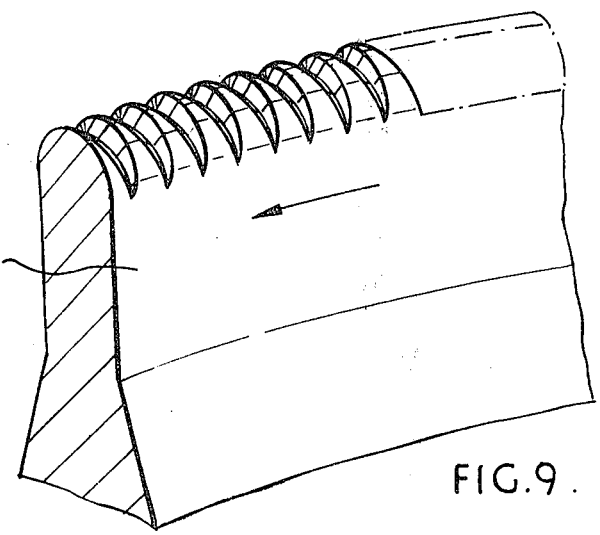
FIG.9.
FIG.10.
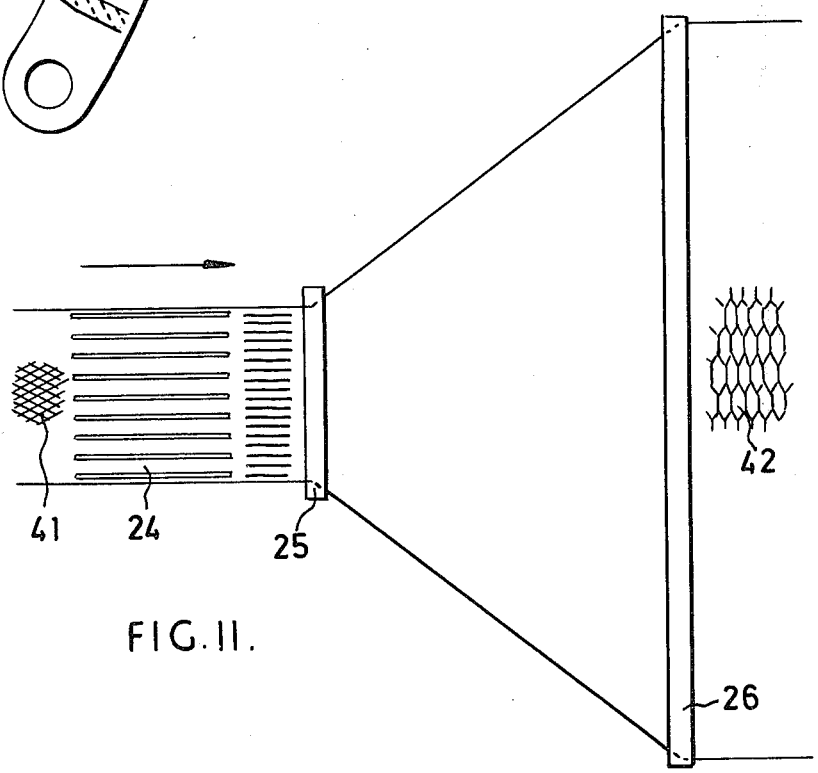
FIG.11.

APPARATUS FOR STRETCHING PLASTIC WEBS

BACKGROUND OF THE INVENTION

This Application is a continuation-in-part of U.S. application Ser. No. 873,945, filed Jan. 31st, 1978, now abandoned which in turn is a division of application Ser. No. 689,127 filed May 24, 1976, now U.S. Pat. No. 9,087,226 issued May 2, 1978.

The present invention relates to apparatus for transversely stretching a continuously advancing flexible web, such as synthetic plastic net or film or sheet. The webs may be rigid when cold but sufficiently flexible when heated to the stretching temperature. The invention relates particularly but not exclusively to the transverse stretching of webs of extruded plastic material nets. The invention relates furthermore to molecularly orientating the web by the transverse stretching.

In the past, considerable effort has been directed towards the design of suitable equipment for both the transverse or (TD) and longitudinal (or machine direction or MD) stretching of travelling webs of synthetic plastic material, and, particularly in the case TD stretching, the equipment was complicated and costly.

German Patent Specifications Nos. 89315 and 94520 describe a wet treatment in which lateral tension is applied to a plaited braid, and it is believed that no substantial switching of the filaments occurred. Large stretch ratios are shown geometrically in FIGS. 1 and 2 of German Patent Specification No. 89315, but it is believed that the depth of interengagement is exaggerated. The scale of the drawings of the German Patent Specification is either half-size or full-size, and the machine would not be suitable for wide plastic webs. However, the edges of the discs shown in German Patent Specification No. 89315 are serrated in that the small points of the serrations engage in the meshes of the plaiting or perhaps penetrate into the staple fibres themselves.

In U.S. Pat. No. 3,624,874 and Canadian Pat. No. 801 907, there is a more recent proposal of a machine for the transverse spreading or tensioning of fabrics, and in which some actual stretching or elongation of the fibres may have occurred. The disclosure is for smoothing out conventional woven cloth, primarily to remove crimps, though the yarn will be stretched somewhat and a small degree of stretch may be imparted to the individual fibers themselves; however, the preferred fibers are cotton fibers, and it is believed that the stretching is insubstantial even if the fibers are synthetic, and that if the fibers were synthetic, they would already be highly molecularly orientated so that no substantial molecular orientation would occur during the spreading or tensioning. The edges of the fabric are held, but the fabric is not gripped until all the pressure members have engaged the fabric, so that the edges of the fabric will be drawn inwards before transverse tensioning occurs.

A further recent proposal is the fabric stenter dislosed in U.S.S.R. Pat. No. 272 260, where the rolls have only a lightly undulating surface which would not provide sufficient stretching of a plastic web.

THE INVENTION

The present invention provides apparatus for a method of transversely stretching a continuous web, comprising continuously moving the web longitudinally and applying opposed sets of pressure forces to opposite surfaces of the moving web respectively at alternate spaced locations across the width of the web while restraining the lateral web margins from moving substantially laterally inwardly, the locations of said set of forces on one surface of the web being laterally staggered in relation to the location of said set of forces on the other surface of the web and the positions of application of said respective sets of forces overlapping as seen looking in the transverse direction, thereby causing the web to take up an extended path from margin to margin so as to stretch the web transversely into pleated form without substantial lateral inward movement of the web margins.

As described in detail below with particular reference to FIG. 2, transverse stretch can be applied to the web to molecularly orientate the material thereof, which in general can be considered to be the application of an extension of at least one hundred percent of the material of the web, i.e. of the strands of a net. In general, transverse stretch ratios (ratios of output width to input width) of 2.5:1 to 10:1 can be obtained and substantial molecular orientation of the strands and even of the intersections of nets and substantial transverse molecular orientation of films or sheets can be produced. It remains possible to run a continuous process for casting to finished product, for instance in the case of an extruded net including the steps of extrusion, optional machine direction stretching to orientate a square mesh net longitudinally and transverse stretching to orientate transversely. Nevertheless, the apparatus required can be compact and occupy a relatively small space.

The use of discs alone as pressure elements is found to have two disadvantages. For large amounts of transverse stretch, the discs must overlap very significantly and the angle of attack of the discs on the web is very great, i.e. the web engages each disc at a point at which there is a large angle between the plane of the web and the respective tangent of the disc. This can cause the discs to tend to push the web backwards and prevent proper feed of particularly the center part of the web, causing the web to bow backwards in the center (called bow-back). In addition, the initial rate of transverse stretching or distortion of the web is very high, which rate decreases as the web continues over the discs, which is undesirable for many webs and does not give optimum stretching.

In seeking to avoid these disadvantages, it is found that the pressure elements of at least one of the banks can be stationary pressure members providing longitudinally-extending slide surfaces.

Replacing the rotary circular members (the discs) or belts of at least one of the banks of the first apparatus by stationary pressure members, the angle of attack referred to above can be reduced to a suitable value and the rate of transverse stretching can be more precisely controlled, in particular to avoid too rapid an initial rate and preferably to provide a substantially constant rate of stretch until the maximum stretch is attained. The stationary pressure members are relatively inexpensive to fabricate so that the apparatus itself can be inexpensive.

The pressure elements of the other bank may be for instance in the form of:

(a) further stationary pressure members providing longitudinally-extending slide surfaces (this form is most practicable with light weight webs, for example packaging nets having a weight of up to 10 gms/meter$^2$ after transverse stretching);

(b) movable belts arranged to advance preferably at substantially the same speed as the web;

(c) rotary circular members whose peripheries are arranged to advance preferably at substantially the same speed as the web.

The stationary pressure members referred to above can be rigid bars or tubes, or can be parallel plates. The slide surfaces can be straight, particularly in forms (a) or (b) above, or can be curved to provide a determined rate of stretch, particularly in form (c) above.

The drive means can be provided in any suitable way, even by simple traction from downstream of the apparatus, for instance in form (a) above. However, in general for nets, the outside rotary members or belts (when present) can be driven and provided with radial pins on their web-engaging surfaces (when such rotary members or belts can also act as the margin restraining means) and, furthermore, all the rotary members or belts can be driven and provided with radial pins or knurling or peripheral notching on their web-engaging surfaces as this gives two advantages, firstly that the apparatus can accept any width of web within a wide range and secondly that such a measure can eliminate all substantial bow-back; some minor, unsubstantial bow-back may occur in the form of a series of scallops across the width of the web, and these if necessary can be pulled out by low transverse stretch and heat setting. In the case of film, pins could tear the edges of the film and thus clips carried on lateral belts or V-belts or cables co-operating with V-grooves can be used as the drive means, at the same time acting as the margin-restraining means. The margin-restraining means can be provided in any suitable way. In general terms, the margin-restraining means may comprise endless traction means extending parallel to the respective margins of the web, the traction means being driven and being comprised in said driving means; the traction means may be tenter-type conveyor elements with clips or pins. In another alternative, the margin-restraining means may comprise pin-wheels or other movable gripping elements. The outside rotary members or belts, provided with pins, or with clips or V-belt grips, can act both as drive means and restraining means. As the pins of the rotary members or belts will engage in the meshes of the net, the net can move inwards by up to one mesh width, but in practice such movement is not substantial and is normally acceptable.

Thus, in the context of this specification, it will be appreciated that the term "restraining the lateral web margins" does not necessarily imply a complete restraint of the longitudinal margins of a web or web section. In general, the web margin restraining means preferably engage the web before or simultaneously with engagement by the pressure elements.

Any suitable film, sheet or net can be transversely stretched, though the resulting transversely stretched structure is preferably a mesh structure. As one example, the method could be used for one of the stretching operations described in U.S. Pat. No. 3,386,876, U.S. Pat. No. 3,441,638 or U.S. Pat. No. 3,666,609.

In general the invention can be used for what are known as square mesh nets, in which the strands run longitudinally and transversely, whether the meshes are actually square or are merely rectangular. Alternatively, the invention can be used for what are known as diamond mesh nets. A diamond mesh net has two sets of strands, each set extending at an angle to the other set and obliquely to the machine and transverse directions, the sets being interconnected by tenacious joints or intersections. The diamond mesh nets can be transversely stretched to such an extent that only the parts of the strands between the intersections are stretched and molecularly oriented, or the intersections can themselves be partly or wholly stretched and molecularly oriented, for example, as described in U.S. Pat. No. 4,020,208 or U.S. Pat. No. 4,059,713.

In modern production, integrally extruded nets are usually made in tubular form. Preferably, the net is slit before transverse stretching, but if desired the net could be transversely stretched in what is known as "lay flat" form, i.e. in two layers, and then subsequently slit if desired; as the margins of the "lay flat" net would not normally be properly transversely stretched, the margins can be trimmed. A further possibility would be to pass the tubular net over a skeletal mandrel formed of stationary pressure members providing longitudinally-extending slide surfaces in a tubular array, thereby forming one bank, with the other bank positioned around the mandrel.

The net may be biplanar or monoplanar, or intermediate the two. In a biplanar net, the strands of one set are in a plane which is parallel to, but not identical with, a plane containing the strands of the other set; in a monoplanar net, the two sets of strands are in the same plane.

BRIEF DESCRIPTION OF THE DRAWINGS

The invention will be further described, by way of example, with reference to the accompanying drawings, in which:

FIG. 9 is an isometric view, on a much larger scale, of part of the periphery of one of the pressure elements of the embodiment of FIGS. 5 and 6, showing an improvement;

FIG. 10 is a view of one of the stationary pressure elements of the embodiment of FIGS. 5 and 6, showing an improvement, various sections at right angles to the plane of FIG. 10 being shown in the plane of the Figure; and FIG. 11 is a schematic plan view of part of the plant of FIG. 4, showing the formation of a hexagonal mesh from a diamond mesh.

DETAILED DESCRIPTION OF THE DRAWINGS

The drawings all show the transverse stretching of a net, and the net can be of diagonal mesh or of square mesh. However, if appropriate, the web could be a plastic material film or sheet and not a net. The web will be of substantial width, i.e. much wider than a tape or braid, for instance being about one meter wide. The probable range of widths is from 0.5 meter up to 5 meters. The stretching is such as to molecularly orientate the strands of the net (or transversely orientate the film or sheet, if the film or sheet is being stretched). Thus, if the net is a square mesh net, the transversely-extending strands will be stretched and molecularly orientated, and if the net is a diamond mesh net, the strands between the intersections can be stretched and molecularly oriented, and, if desired, the net can be stretched to such an extent that the joins or intersections between the strands are stretched, either fully or partly, giving hexagonal meshes.

Figure 1:
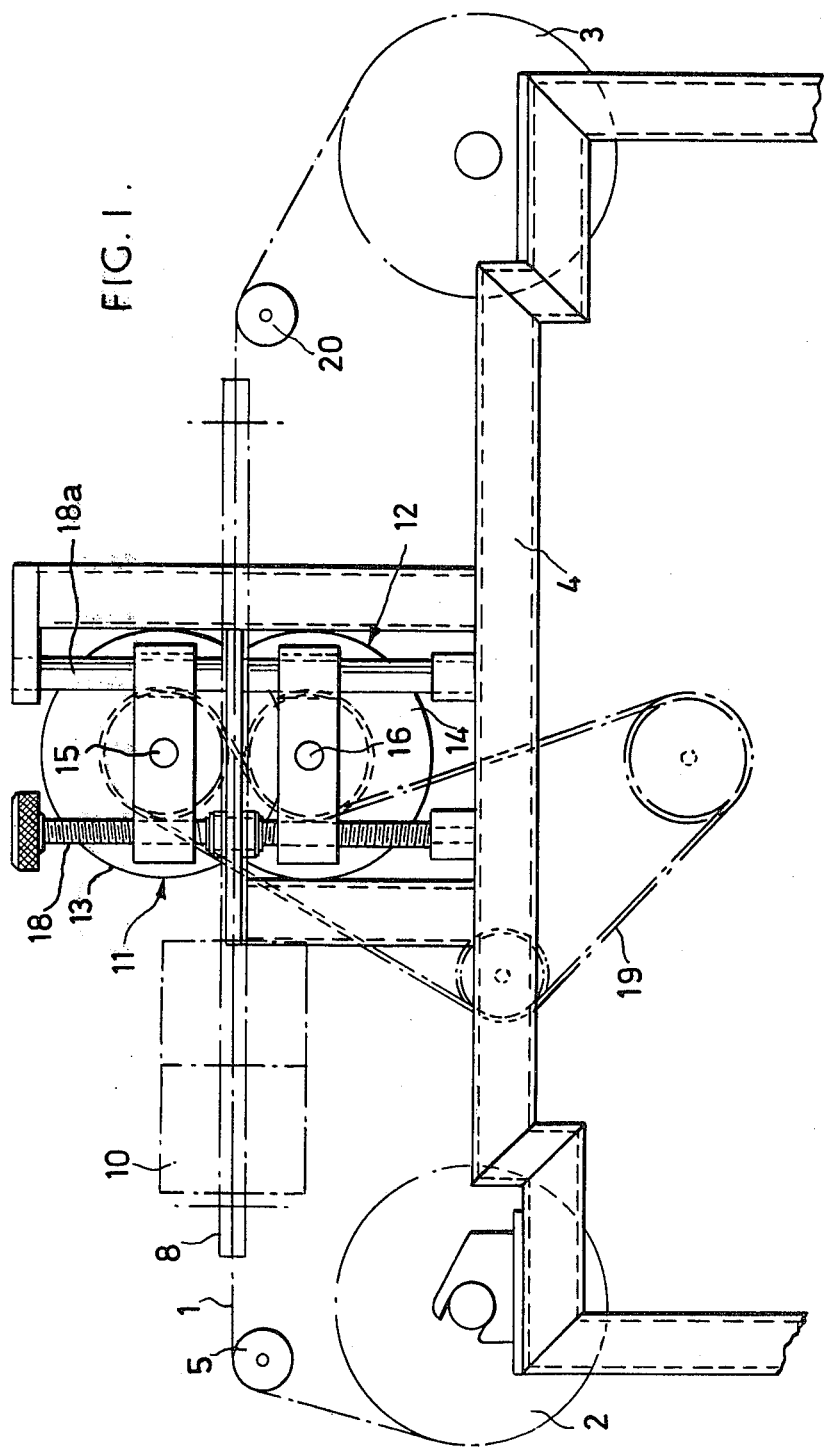
FIG. 1 is a side elevation of a plant including a first stretching apparatus of the invention.
Figure 2:
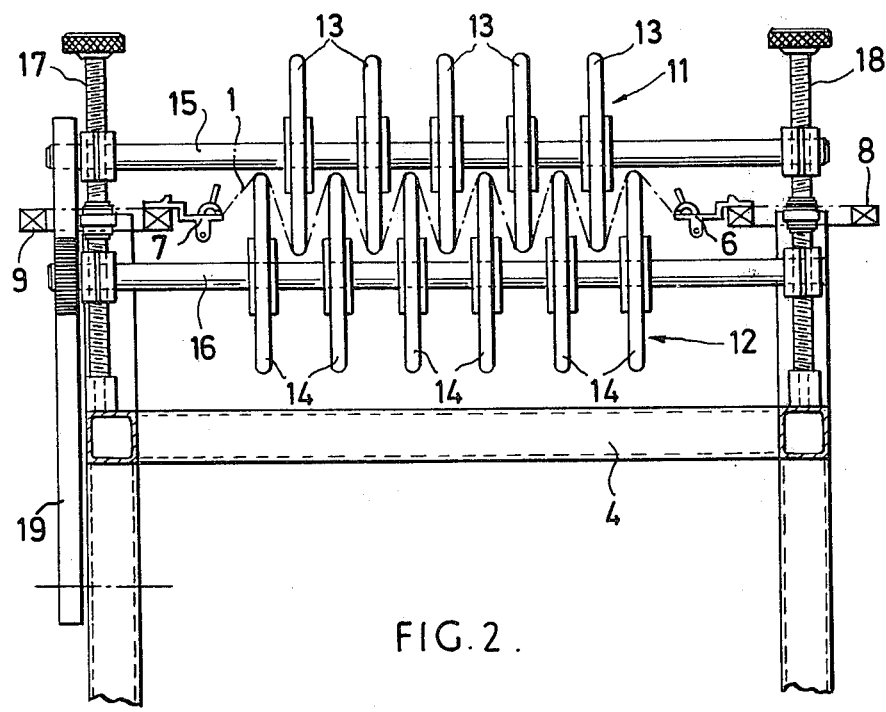
FIG. 2 is an end elevation of the first apparatus.
Figure 3:
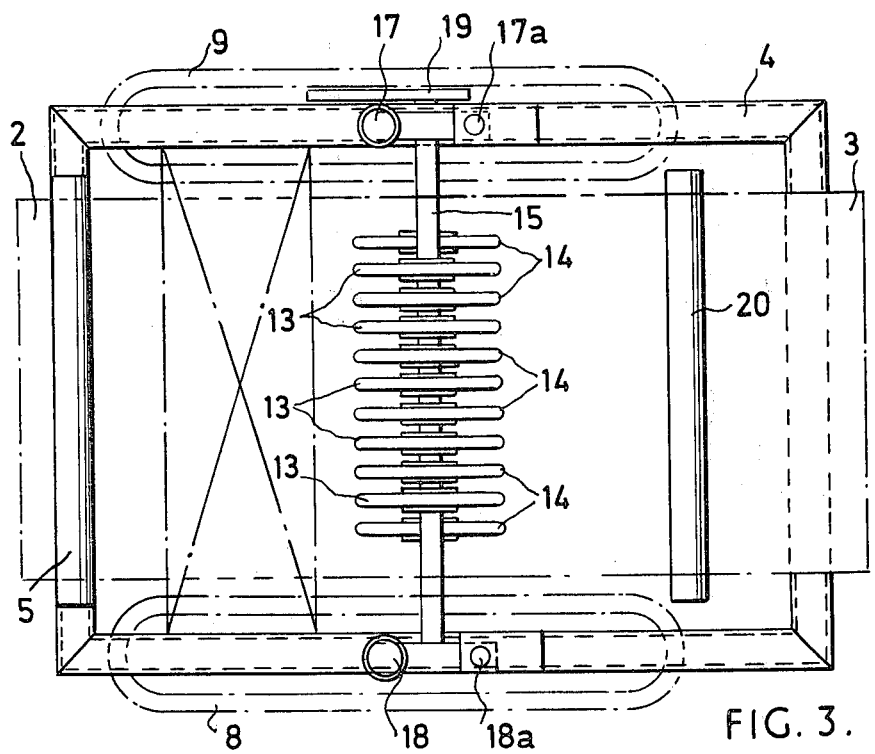
FIG. 3 is a plan view of the first apparatus.

Referring to FIGS. 1 to 3 of the drawings, a web 1 of material to be transversely stretched is unwound from a storage reel 2 onto a driven take-up reel 3, the reels 2 and 3 being journalled at opposite ends of a frame 4; the web 1 may, for example, be an extruded plastic net having one set of strands extending longitudinally of the net and another set of strands extending transversely of the net. After passing over a guide roll 5, the longitudinal edges of the web are gripped by the clips 6 and 7 of a pair of conventional tenter-type endless conveyor chains 8 and 9 driven at the same linear speed as the travelling web. The clips 6 and 7 lie substantially in the plane of the web and are spaced apart along the whole length of the chains substantially at the original width of the web so that the clips prevent the longitudinal web margins from contracting laterally towards one another.

While in the grip of the clips, the web passes first through a heater 10 (if required for the stretching process) which in the case of the plastic net mentioned may be, for example, a hot air blower or hot water sprays to heat the net to up to 120° C. Then, the web proceeds through a transverse stretching arrangement comprising opposed pressure banks 11 and 12 which operate respectively on the upper and lower web surfaces. The banks each comprise a series of laterally spaced wheels or disc-like rollers 13, 14 keyed to shafts 15, 16, the rollers 13 being transversely staggered in relation to the rollers 14 and, as seen in the transverse direction, overlapping the rollers 14 vertically, i.e. across the plane of the clips 6, 7 or the original plane of the web. With this arrangement, as the web is drawn between the respective banks of rollers 13, 14, the rollers 13, 14 apply opposed forces respectively to the opposite surfaces of the web at alternately spaced locations across the width of the web; the web is transversely stretched into a wave-like or zig-zag form (pleated form) and takes up an extended path from margin to margin as shown in FIG. 2, the degree of stretch imparted being determined by the degree of vertical overlap of the respective roller banks (i.e. the length of the extended path). The rollers 13, 14 have anti-friction surfaces to promote lateral slipping of the web across the rollers and uniform stretching of the web across its width. To this end the roller peripheries may be of polished metal or PTFE coated.

Preferably, the web-engaging surface of all the pressure elements (except possibly the outermost ones when they are used as drive means or web margin restraining means) are formed of anti-friction material, even when the elements carry pins, to allow transverse slippage of the web across such surfaces; in other words, the web can move transversely during stretching, at locations where the pressure forces act on the web. The use of the antifriction web-engaging surfaces can give, particularly in the case of extruded plastic net, optimum and uniform stretching across the width of the web. If transverse web movement is frictionally inhibited, longitudinal bands with differential stretch characteristics can be formed in the stretched web, resulting in a non-uniform product. The anti-friction material should have as low a coefficient of friction as possible in practical terms, being for instance highly polished metal or polytetrafluoroethylene, or anodised aluminum for the rotary members.

Transverse slippage is of particular importance when stretching a plastic net. When stretching a net, there is an initial resistance to elongation and molecular orientation of the strands, but when this resistance has been overcome, elongation occurs readily until a point is reached at which the resistance to elongation again increases. All the strands of a net are very slightly different from one another, and thus some strands can begin to stretch before others; these strands can be stretched fully before neighboring strands begin to stretch. Thus, it could occur that a strand on one side of a pressure member begins to stretch while the corresponding strand on the other side has not begun to stretch; if the coefficient of friction is sufficiently low between the plastic material and the pressure member, part of the net on the first side will slip over to the other side to enable the first-mentioned strand to stretch fully before the second-mentioned strand begins to stretch. Furthermore, should the net slip one way, it must be able to slip back the other way when the other strand begins to stretch.

Nonetheless, it is found that anti-friction material is not essential, particularly when the pressure elements advance at substantially the same speed as the web. Thus, a satisfactory commercial product can be obtained even if no substantial transverse slippage occurs between the web and the pressure elements during stretching.

The clips 6, 7 prevent any substantial inward movement of the web margins, and thus, as can be seen from FIG. 2, considerable transverse stretching of the web occurs, the actual ratio shown in FIG. 2 being 1:2.3. Such stretching is sufficient to molecularly orientate the web 1.

The shafts 15, 16 are mounted on screw columns 17, 17a and 18, 18a so that the degree of overlap between the respective roller banks can be adjusted to alter the length of the extended path and hence the degree of transverse stretch imparted to the web 1 and the shafts are driven in opposite directions by a common belt drive arrangement 19 at speeds whereby the peripheral speed of the rollers 13, 14 conforms with the linear speed of the travelling web (the rollers 13, 14 could be peripherally notched or knurled to assist in driving the web without impairing the lateral slip characteristics of the rollers).

The web leaves the stretching arrangement in a pleated form and after release from the clips passes over a further guide roll 20 before being wound in a pleated form onto the take-up roll 3. Alternatively, means may be provided for transversely stretching out the web from its pleated form so that it can be wound on the take-up roll.

Figure 4:
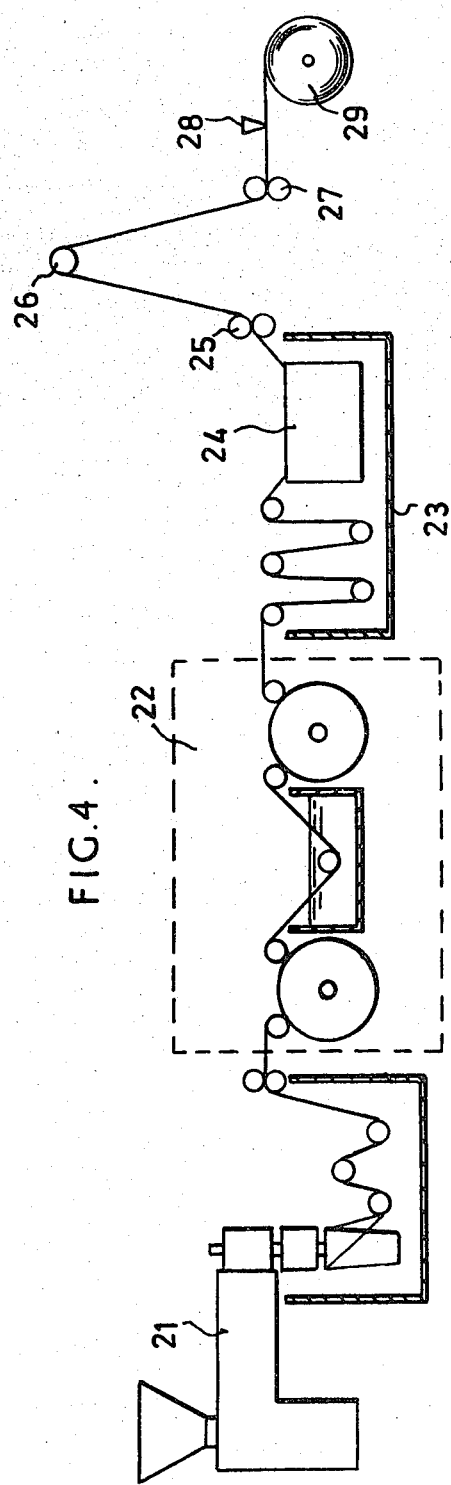
FIG. 4 is a schematic side view of a plant including a second stretching apparatus in accordance with the invention.

In the plant shown in FIG. 4, there is a known extruder 21 for extruding integral plastic net. The net can be furnished as diamond net or alternatively as square mesh net, using known technology. The net can be slit so that it is of single thickness or can be of lay-flat, double thickness tubular form. A square mesh net can be drawn in the machine direction in a drawing arrangement 22 for longitudinal orientation.

Heating means can be provided for maintaining the web at an elevated temperature during transverse stretching. Due to the relatively small size of the apparatus, the heating means can be a hot water or stretch bath 23 in which the web is immersed during its passage between the pressure assemblies. In this way, it is easy to maintain a uniform temperature. The net thus passes into the stretch bath 23, which contains a second transverse stretching apparatus 24 in accordance with the invention, around take-off rollers 25 for taking the transversely stretched net off in a pleated form, around a spreader roller 26 for spreading the net out to its full untensioned width, between conventional textile fabric web edge spreaders 27, known as "Precision Edge Guiders" (a pair of slightly inclined small rollers at each margin of the net), past edge trimmers 28 for cutting off the margins of the net, if desired, which margins will not have been stretched transversely, and onto a wind-on roller 29.

Figure 5:
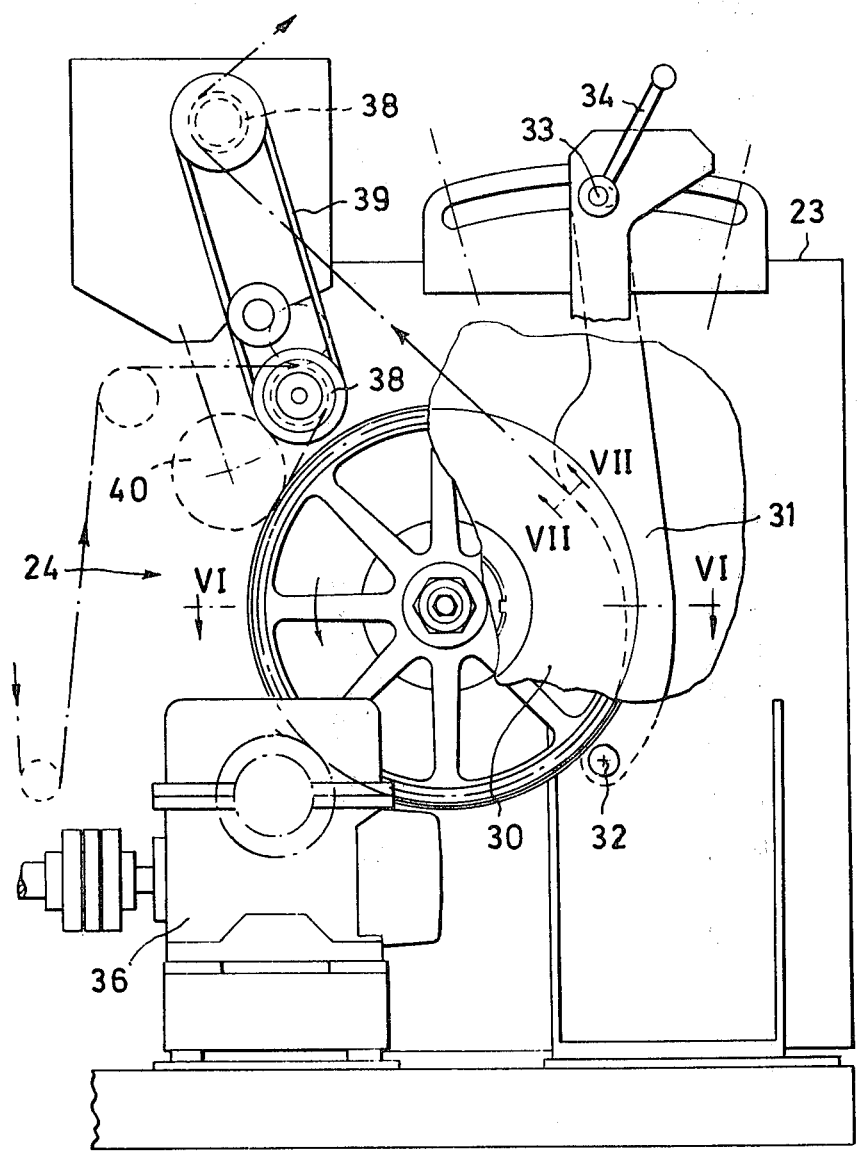
FIG. 5 is a side view showing part of the second apparatus of the invention.
Figure 6:
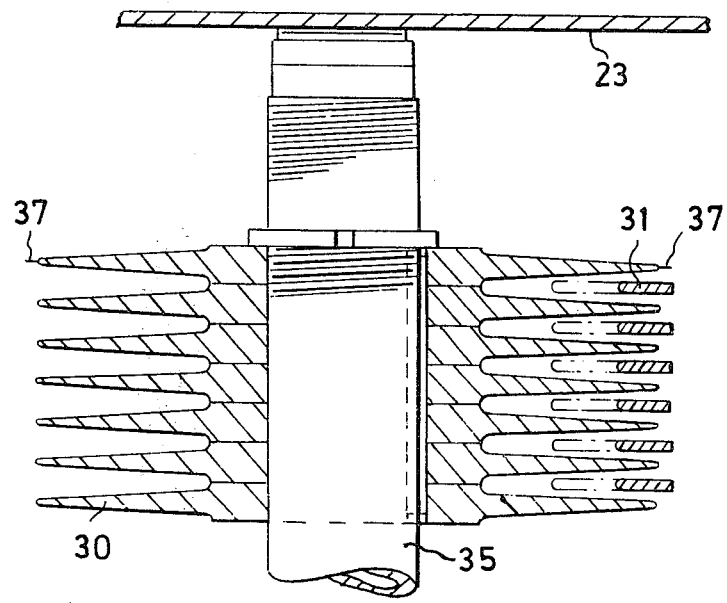
FIG. 6 is a horizontal section along the line VI—VI of FIG. 5.

FIG. 5 and 6 show the second transverse stretching apparatus 24 in more detail. As indicated above, the apparatus 24 is in the bath 23, for containing hot water. The apparatus comprises two pressure assemblies, one of which is a bank of rotary circular pressure members in the form of equally-spaced driven discs 30 and the other of which is a bank of stationary pressure members in the form of pressure plates 31. The pressure plates 31 are individually pivoted about an axis 32 and have low-friction, longitudinally-extending slide surfaces which contact the net.

In general, the amount of overlap of the respective pressure elements is preferably adjustable, to adjust the total transverse stretch imparted to the web and the rate of stretch. More preferably, however, the pressure elements of at least one bank (except possibly the outermost pressure elements) are individually adjustable. Such individual adjustablilty can be provided very simply using the stationary pressure plates 31 which can be pivotally mounted adjacent one end (preferably the inlet end) of the slide surfaces. Often there are casting errors when forming plastic material nets, leading to irregularity across the width of the web, and such errors are magnified when a web is transversely stretched. The individual adjustment of the pressure elements can compensate for such errors. Thus the positions of the pressure plates 33 are individually adjustable, in which case each pressure plate 31 can have its own locking mechanism. Each pressure plate 31 is connected to a cross-bar 33 which can move in an arcuate slot between two extreme positions indicated by dot-dash lines, and which is lockable in position by any suitable mechanism indicated by a lever 34. In theory, the discs 30 could be formed by machining a single roller, but in practice, it is found convenient to provide a number of separate discs, carried on and keyed to a single shaft 35. The discs 30 can be driven in any conventional manner, a drive 36 being indicated in FIG. 5. The outermost discs 30 act as means for restraining the edges of the net and preventing substantial inward movement of the net margins, and carry pins 37 which will engage the net before the net actually touches the peripheries of the discs 30 and substantially before the net reaches the pressure plates 31. If desired, all the discs 30 could carry pins 37, but a preferred, alternative arrangement is shown in FIG. 9, where the discs 30 have knurled peripheries which assist in advancing the web, giving axial traction while permitting transverse slippage.

FIG. 5 also shows a pair of drive rolls 38, interconnected by a pulley and belt drive 39, for ensuring that the outlet speed of the net is the same as the inlet speed and thus preventing axial stretching when passing through the apparatus 24, and a guide roller 40 for guiding the net onto the bank of discs 30.

Figure 7:
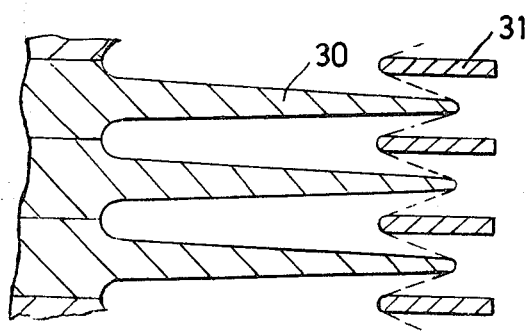
FIGS. 7 and 8 are schematic views in section along the plane VII—VII in FIG. 5, illustrating the operation of the apparatus of FIGS. 5 and 6.
Figure 8:
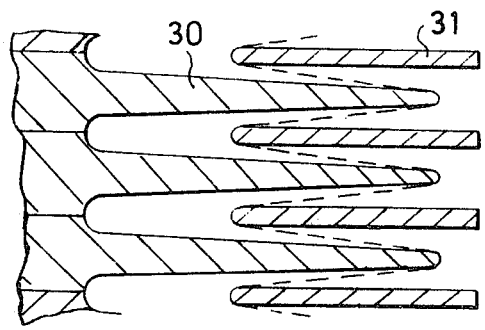

FIGS. 7 and 8 indicate the stretching of the net at two different settings of the pressure plates 31. The net is indicated in dashed lines, and it will be seen that in FIG. 7 the net is distorted into pleated form by the alternate interaction of the discs 30 and the pressure plates 31 and thereby stretched transversely to a stretch ratio of about 2.25:1. In FIG. 8, the pressure plates 34 have been adjusted to a greater depth, and the stretch ratio is about 5.5:1. In practice, the pressure plates 31 can be positioned relative to the discs 30 in order to give final stretch ratios of up to 8:1 or even greater, examples being 4:1, 6:1 and 8:1. The pressure plates 31 are specifically shaped, as seen looking axially of the discs 30, so that a substantially constant rate of stretch is provided until maximum stretch is obtained. In addition, the initial surfaces of the pressure plates 31 are arranged to be tangential to the peripheries of the discs 30, thereby providing a zero or very low initial rate of transverse stretching and avoiding any objectionable bow-back. It will be noted from FIG. 5 that the lower ends of the plates 31 are of circular shape, centered on the pivot axis 32, so that the initial surfaces of the pressure plates 31 are tangential to the peripheries of the discs 30, whatever the setting of the pressure plates 31.

Although the web could be transversely stretched and molecularly orientated in a satisfactory manner, the product was not perfect in all cases, particularly when higher speeds or higher stretch ratios were used. The design of the web-engaging surfaces of the pressure elements gave a particular problem in that if the section of the surface, in the transverse plane, had too large a radius, bands of the web tended to remain unstretched where the web had been in contact with the pressure elements; on the other hand, there were few heating or tearing problems. However, if the radius was small, the bands of unstretched web were insignificant or did not appear, but heating and tearing occurred at higher speeds.

This problem can be reduced or eliminated by designing the web-engaging surfaces as shown in FIG. 10.

In operation, the web is deflected from the transverse direction as it is engaged by the pressure plates 31 (see FIG. 7 or 8). In general terms, it will be seen that the width of the web-engaging surface of the pressure plate 31, as measured along the surface generally in the transverse direction, would increase as the web passes between the banks of pressure elements for the same amount of deflection of the web from the transverse direction. This provides a useful definition of the effect which occurs in FIG. 10, though it is appreciated that in practice, the deflection of the web increases as the web passes between the banks of the pressure elements; thus the hypothetical situation of the deflection of the web remaining the same is merely taken to define how the web-engaging surfaces of the pressure elements alter. It is believed that it is the width of the surface which is the important parameter, but in the more specific and usual case where the web-engaging surfaces of the pressure elements are generally part-circular as seen in section in the transverse plane, the radius of the cross-sectional shape at the end of the transverse stretching is substantially greater than at the beginning, and is preferably about double that at the beginning. Stated somewhat more generally, if the web-engaging surfaces of the pressure elements of at least one of the banks are curved as seen in transverse cross-section, the rate of curvature decreases as the web passes between the banks of the pressure elements.

Using this feature, it is found that the bands of unstretched netting can be reduced in width or eliminated altogether, while the apparatus can be operated at relatively high speeds without heating problems and without tearing. It is in practice simple to apply the feature to stationary pressure members as the web-engaging surfaces of the stationary pressure members can be provided with fixed, tapering peripheries.

FIG. 10 shows the preferred arrangement of the web-engaging surfaces of the pressure plates 31. The cross-sectional shapes of the pressure plates 31 shown in FIG. 10 are illustrated in the plane of the Figure at five different points along the pressure plate 31. The surface is part-circular as seen in transverse section, and the radius of the cross-sectional shape at the end of transverse stretching is about double that at the beginning. As shown in FIG. 10, the required shape can be obtained by tapering the section in the earlier parts of the pressure plate 31 and rounding off the end. The initial part of the web-engaging surface, up as far as the position of the first cross-section shown in FIG. 10, is of uniform section, and the rate of curvature of the section then decreases gradually and continuously until the last cross-section shown in FIG. 10 is reached, the cross-section then being uniform until the end of the pressure plate 31 is reached. The web-engaging surface of the pressure plate 31 may be coated in polytetrafluoroethylene, but the whole pressure plate 31 is preferably made of stainless steel or of anodised aluminium.

FIG. 11 shows, in a schematic manner, the formation of a hexagonal mesh using the plant of FIG. 4. It will be seen that the net enters the stretching apparatus 24 in the form of a diamond mesh 41 and issues as a hexagonal mesh (seen at 42) which passes in pleated form around the take-off roller 25 and is spread out to its full untensioned width by the spread-out roller 26.

WORKING EXAMPLES
The apparatus was as in FIGS. 5 to 10.

| | | |
|---|---|---|
| 1. Product type | mattress net, square mesh | fruit cage, square mesh |
| 2. Type of plastic | polypropylene | high density P.E. |
| 3. Weight of cast net | 600 gms./sq. mtr. | 500 gms./sq. mtr. |
| 4. Machine direction stretch (orientation) ratio | 4:1 | 4.5:1 |
| 5. Pre-heat time | 6 to 7 seconds | 6 to 7 seconds |
| 6. Stretch temperature | 98° C. | 98° C. |
| 7. Transverse stretch (orientation) ratio | 4:1 | 4.5:1 |
| 8. Linear speed | 60 meters/min. | 60 meters/min. |
| 9. Diameter of discs 30 | 50 cms. | 50 cms. |
| 10. Segmental angle of wheel on which stretching takes place. | 90° | 90° |
| 11. Rate of transverse orientation | uniform | uniform |
| 12. Length of pressure plates 31 in contact with net during stretching | 350mm | 350mm |
| 13. Initial/final radius of net-engaging surface of pressure plates 11 | 3mm/6mm | 3mm/6mm |
| 14. Weight of finished biaxially oriented net. | 30 gms/sq. mtr. | 25 gms/sq. mtr. |

I claim:

1. Apparatus for transversely stretching and molecularly orientating a continuously advancing flexible web, comprising restraining means for preventing substantial inward movement of the web margins, a pair of opposed banks of transversely-spaced pressure elements between which banks the web can travel while its margins are engaged by the restraining means, the pressure elements of one bank being transversely staggered in relation to the elements of the other bank and, as seen looking in the transverse direction, overlapping the pressure elements of the other bank with such a degree of overlap that the pressure elements cause the web to take up an extended form from margin to margin by applying opposed forces respectively to the opposite surfaces of the web at spaced locations across the width of the web and transversely stretch the web into a pleated form without substantial inward movement of the web margins, the pressure elements of at least one of the banks being stationary pressure members providing slide surfaces extending in the direction of advance of the web wherein the slide surfaces provide a reduced initial rate of stretch of the web which increases at a substantially constant rate of stretch in transit between the opposed pressure elements, said reduced initial rate of stretch being provided by biasing of the stationary pressure members against one side of the web, which web is biased on its other side by the opposed pressure elements, the relationship between the pressure elements being such that the distance between the slide surfaces of the stationary pressure members and the surfaces of the opposed pressure elements increases with the distance along the slide surfaces, the initial contact point of the stationary pressure members with the web being substantially tangential to the peripheries of the opposed pressure elements, and drive means for continuously advancing the web between the banks whereby the pressure elements continuously transversely stretch the web.

2. The apparatus of claim 1, wherein the slide surfaces are positioned between the web margin restraining means.

3. The apparatus of claim 1, wherein the web-engaging surfaces of the pressure elements of the other bank have means for advancing at substantially the same speed as the web.

4. The apparatus of claim 3, for transversely stretching a web having holes therein, wherein the web-engaging surfaces of the pressure elements of the other bank have peripheries which, as seen in section normal to the direction of advance of the web, are convexly rounded, and which are provided with transverse grooves, the transverse grooves being spaced from one another in the direction of advance of the web and each groove having a bottom which, as seen in said section, is rounded in the same sense as the respective web-engaging surface.

5. The apparatus of claim 3, for transversely stretching a web having holes therein, wherein the web-engaging surfaces of the pressure elements of the other bank are provided with knurls for engaging in the holes of the web for continuously advancing the net.

6. The apparatus of claim 3, wherein the outside pressure elements are driven and are provided with radial pins on their web-engaging surfaces, thereby acting as said web margin restraining means and as said drive means.

7. The apparatus of claim 6 wherein the web-engaging surfaces of at least all but the outside pressure elements are formed of anti-friction material.

8. The apparatus of claim 1, wherein the outermost pressure elements are the web restraining means and the web-engaging surfaces of at least all but the outermost pressure elements are formed of anti-friction material.

9. The apparatus of claim 1, 5, 6, or 4 wherein the pressure elements of the other bank are rotary discs and the stationary pressure members provide longitudinally-extending slide surfaces which are concavely curved toward the axes of said rotary discs.

10. The apparatus of claim 1 wherein the slide surfaces are contoured so as to provide a substantially constant rate of stretch of the web until the maximum stretch of the web is obtained.

11. Apparatus for transversely stretching and molecularly orientating a continuously advancing flexible web, comprising restraining means for preventing substantial inward movement of the web margins, a pair of opposed banks of transversely-spaced pressure elements between which banks the web can travel while its margins are engaged by the restraining means, the pressure elements of one bank being transversely staggered in relation to the elements of the other bank and, as seen looking in the transverse direction, overlapping the pressure elements of the other bank with such a degree of overlap that the pressure elements cause the web to take up an extended form from margin to margin by applying opposed forces respectively to the opposite surfaces of the web at spaced locations across the width of the web and transversely stretch the web into a pleated form without substantial inward movement of the web margins, the pressure elements of at least one of the banks having web-engaging surfaces which are non-uniform along the length of the surface in the longitudinal direction, and, for the same amount of deflection of the web from the transverse direction as it is engaged by the pressure elements, the width of each non-uniform web-engaging surface, as measured along the surface generally in the transverse direction, increasing as the web passes between the banks of pressure elements, and drive means for continuously advancing the web longitudinally between the banks whereby the pressure elements continuously transversely stretch the web.

12. Apparatus for transversely stretching and molecularly orientating a continuously advancing flexible web, comprising restraining means for preventing substantial inward movement of the web margins, a pair of opposed banks of transversely-spaced pressure elements between which banks the web can travel while its margins are engaged by the restraining means, the pressure elements of one bank being transversely staggered in relation to the elements of the other bank and, as seen looking in the transverse direction, overlapping the pressure elements of the other bank with such a degree of overlap that the pressure elements cause the web to take up an extended form from margin to margin by applying opposed forces respectively to the opposite surfaces of the web at spaced locations across the width of the web and transversely stretch the web into a pleated form without substantial inward movement of the web margins, a plurality of the pressure elements of at least one of the banks being mounted for individual adjusting movement to adjust the amount of overlap of the individual pressure elements with respect to the pressure elements of the other bank, respective adjustment means associated with the pressure elements for effecting their individual adjustments, and drive means for continuously advancing the web longitudinally between the banks whereby the pressure elements continuously transversely stretch the web.

13. Apparatus for transversely stretching and molecularly orientating a continuously advancing flexible web, comprising restraining means for preventing substantial inward movement of the web margins, a pair of opposed banks of transversely-spaced pressure elements between which banks the web can travel while its margins are engaged by the restraining means, the pressure elements of one bank being transversely staggered in relation to the elements of the other bank and, as seen looking in the transverse direction, overlapping the pressure elements of the other bank with such a degree of overlap that the pressure elements cause the web to take up an extended form from margin to margin by applying opposed forces respectively to the opposite surfaces of the web at spaced locations across the width of the web and transversely stretch the web into a pleated form without substantial inward movement of the web margins, the pressure elements of at least one of the banks being stationary pressure members providing slide surfaces extending in the direction of the web and wherein a plurality of the pressure elements of at least one of the banks are mounted for individual adjusting movement to adjust the amount of overlap of the individual pressure elements with respect to the pressure elements of the other bank, the apparatus further comprising respective adjustment means associated with the pressure elements for effecting their individual adjustments, and drive means for continuously advancing the web between the banks whereby the pressure elements continuously transversely stretch the web.

14. Apparatus for transversely stretching and molecularly orientating a continuously advancing flexible web, comprising a restraining means for preventing substantial inward movement of the web margins, a pair of opposed banks of transversely-spaced pressure elements between which banks the web can travel while its margins are engaged by the restraining means, the pressure elements of one bank being transversely staggered in relation to the elements of the other bank and, as seen looking in the transverse direction, overlapping the pressure elements of the other bank with such a degree of overlap that the pressure elements cause the web to take up an extended form from margin to margin by applying opposed forces respectively to the opposite surfaces of the web at spaced locations across the width of the web and transversely stretch the web into a pleated form without substantial inward movement of the web margins, the pressure elements of at least one of the banks being stationary pressure members providing slide surfaces extending in the direction of the web, the stationary pressure members being pivotally mounted adjacent the inlet end of the slide surfaces, the inlet end of each slide surface being part circular, centered on the axis of pivotal mounting and substantially tangential to the web-engaging surfaces of the pressure elements of the other bank, as seen looking in the transverse direction, the apparatus further comprising adjustment means associated with the stationary pressure members for adjusting the amount of overlap of the stationary pressure members with respect to the pressure elements of the other bank, and drive means for continuously advancing the web between the banks whereby the pressure elements continuously transversely stretch the web.

* * * * *